Aug. 16, 1949.      R. CLARK ET AL      2,479,314
SEPARABLE TIRE RIM
Filed Dec. 9, 1947

R. Clark
S. Clark
L. B. Moss
INVENTORS

BY C. A. Snow & Co.
ATTORNEYS.

Patented Aug. 16, 1949

2,479,314

UNITED STATES PATENT OFFICE 2,479,314

SEPARABLE TIRE RIM

Rufus Clark and Samuel Clark, Casa Blanca, and Leander B. Moss, Riverside, Calif.

Application December 9, 1947, Serial No. 790,448

1 Claim. (Cl. 152—377)

Our present invention relates generally to wheels for automotive vehicles, and more specifically to an improved separable tire rim of the radially expansible and contractible type utilizing circumferentially arranged wedge or slide sections and screw bolts for actuating the sections.

The primary object of the invention is the provision of a demountable rim of this type that is composed of a minimum number of parts, which together with the wheel of the metal disk type, may with facility be manufactured with a comparatively low cost of production, and the parts assembled with convenience, to provide means whereby the tire after the rim has been removed from its axle, may be changed with a minimum expenditure of time and labor.

The invention consists in certain novel features of construction and combinations and arrangements of parts as will hereinafter be described in detail and more particularly set forth in the appended claim.

In the accompanying drawings we have illustrated a complete example of a physical embodiment of our invention wherein the parts are combined and arranged in accord with one mode that we have devised for the practical application of the principles of our invention. It will however be understood that changes and alterations are contemplated and may be made in these exemplifying drawings and mechanical structures, within the scope of our claim without departing from the principles of the invention.

Figure 1:
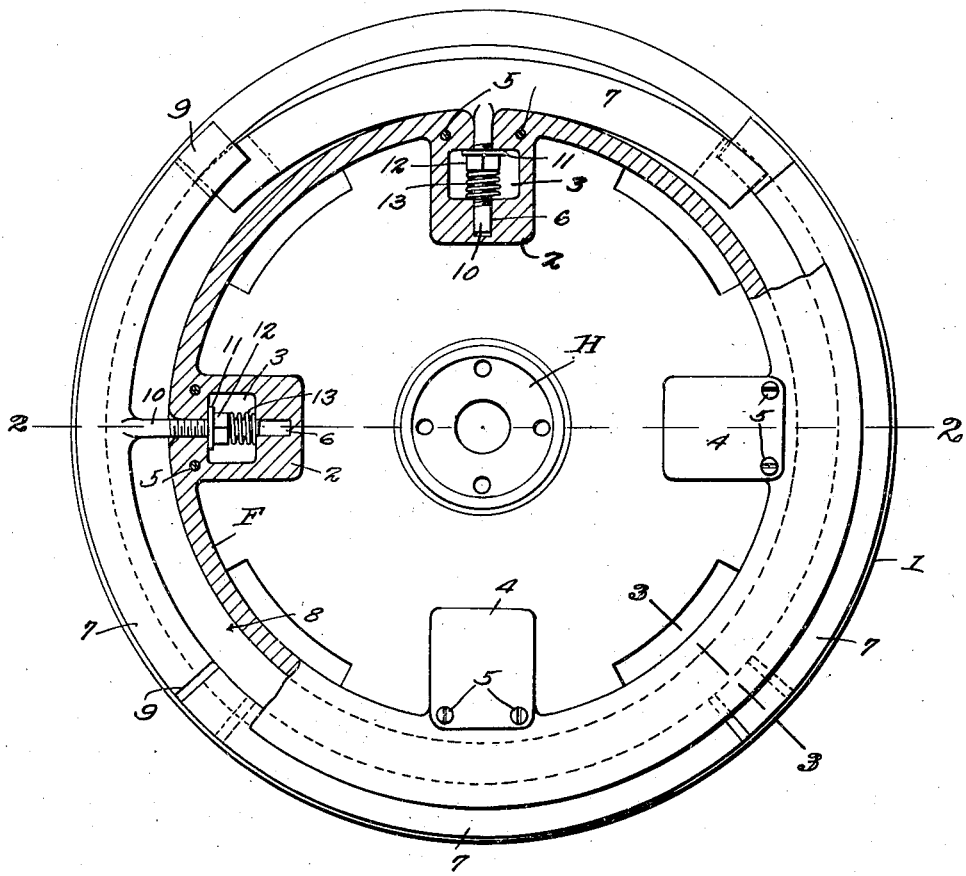
Figure 1 is a view in elevation at the outer side of a metal disk wheel, with parts broken away for convenience of illustration, showing an embodiment of our invention.
Figure 2:
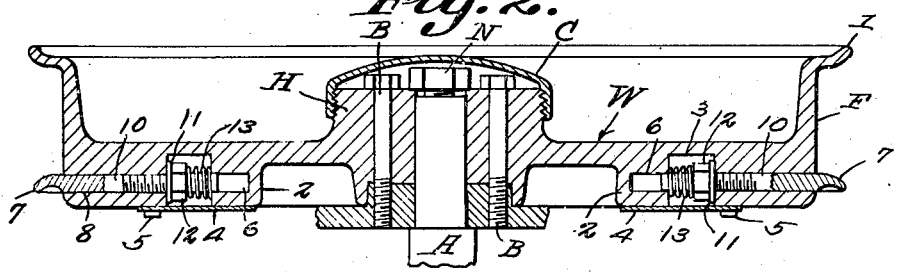
Figure 2 is a horizontal sectional view at line 2—2 of Figure 1.
Figure 3:
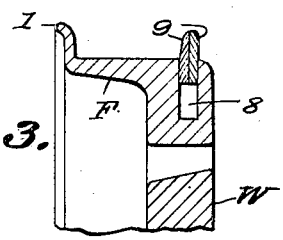
Figure 3 is a detail sectional view at line 3—3 of Figure 1 showing the reduced overlapped ends of the sections that make the circumferential demountable rim.

In order that the general relation and utility of parts may readily be understood we have disclosed a wheel W of the metal disk type that is equipped with our demountable rim, and it will be understood that in changing tires the rim is first removed from its axle A for ready access to the operating parts of the demountable rim. The hub H of the wheel is provided with usual stud bolts BB that are withdrawn for removal of the wheel, and a conventional hub cap C and nut N are indicated, the latter for securing the wheel on the journal end of the axle A.

The felloe F of the wheel is fashioned at the outer side with a stationary, or fixed circumferential rim 1, and in carrying out our invention, the inner side of the wheel is provided with a suitable number, here shown as four, of enlarged hollow heads 2 that form cavities or chambers 3 that open outwardly and are provided with protecting plates or dust covers 4 secured by detachable means as screws 5; and these chambers or cavities intercept radially extending bores 6, that are diametrically arranged about the wheel.

The expansible and contractible rim preferably includes four T-shaped quadrants or rim sections 7, and these segments extend circumferentially of the wheel and are spaced laterally of the stationary rim 1. The sections are mounted in and radially movable in an annular slot 8 that opens to the exterior of the felloe, and the ends of adjoining sections or quadrants are reduced in thickness as at 9 in order that the sections may overlap and form a continuous circumferential rim for co-action with the fixed rim 1.

The four radially arranged units of the demountable rim are similar in construction and operation, and therefore a description of one will suffice for all of them.

Each quadrant or section is equipped with an integral or fixed bolt 10 reciprocably mounted in a bore 6 of a hollow head, and the threaded portion of the bolt is provided with a friction washer 11 and lock nut 12 located within the chamber 3 of the head, and a spring 13 is coiled about the bolt and interposed between the lock nut and a wall of the chamber to resiliently retain the section in proper position.

After the wheel has been removed from its axle and the cover plates 4 are detached, the non-traveling nuts 12 may be turned with a wrench to successively retract the several sections of the demountable rim within the annular groove, thus releasing the tire for its removal from the rim. In mounting another tire on the rim and after the tire is in place on the felloe, the nuts are turned with a suitable tool to expand the demountable tire rim for co-action with the fixed rim 1 in retaining the tire, the cover plates 4 are closed, and the wheel is ready for attachment to the axle.

Having thus fully described our invention, what we claim as new and desire to secure by Letters Patent, is:

The combination with a vehicle wheel of the metal disk type having a circumferentially slotted felloe and a series of exterior radially disposed housings, of a series of segmental rim-sections having reduced overlapped adjoining ends and mounted in the slotted felloe, a radially arranged bolt rigid with each section, and means in the housings for co-action with the bolts for projecting and retracting said sections.

RUFUS CLARK.
    SAMUEL CLARK.
    LEANDER B. MOSS.

REFERENCES CITED

The following references are of record in the file of this patent:

UNITED STATES PATENTS

| Number | Name | Date |
|---|---|---|
| 991,311 | Howard | May 2, 1911 |
| 1,206,109 | Huager | Nov. 28, 1916 |
| 1,589,448 | Wagenhorst | June 22, 1926 |
| 1,632,382 | Sacre | June 14, 1927 |

FOREIGN PATENTS

| Number | Country | Date |
|---|---|---|
| 5,342 | Austria | 1900 |
| 166,193 | Britain | 1921 |
| 678,098 | France | 1930 |